June 14, 1966 W. E. KERSCHBAUM 3,255,683
PHOTOCOMPOSING MACHINES
Filed Feb. 24, 1964 4 Sheets-Sheet 1

Fig:1.

INVENTOR.
WALTER E. KERSCHBAUM
BY
ATTORNEY

INVENTOR.
WALTER E. KERSCHBAUM
BY
ATTORNEY

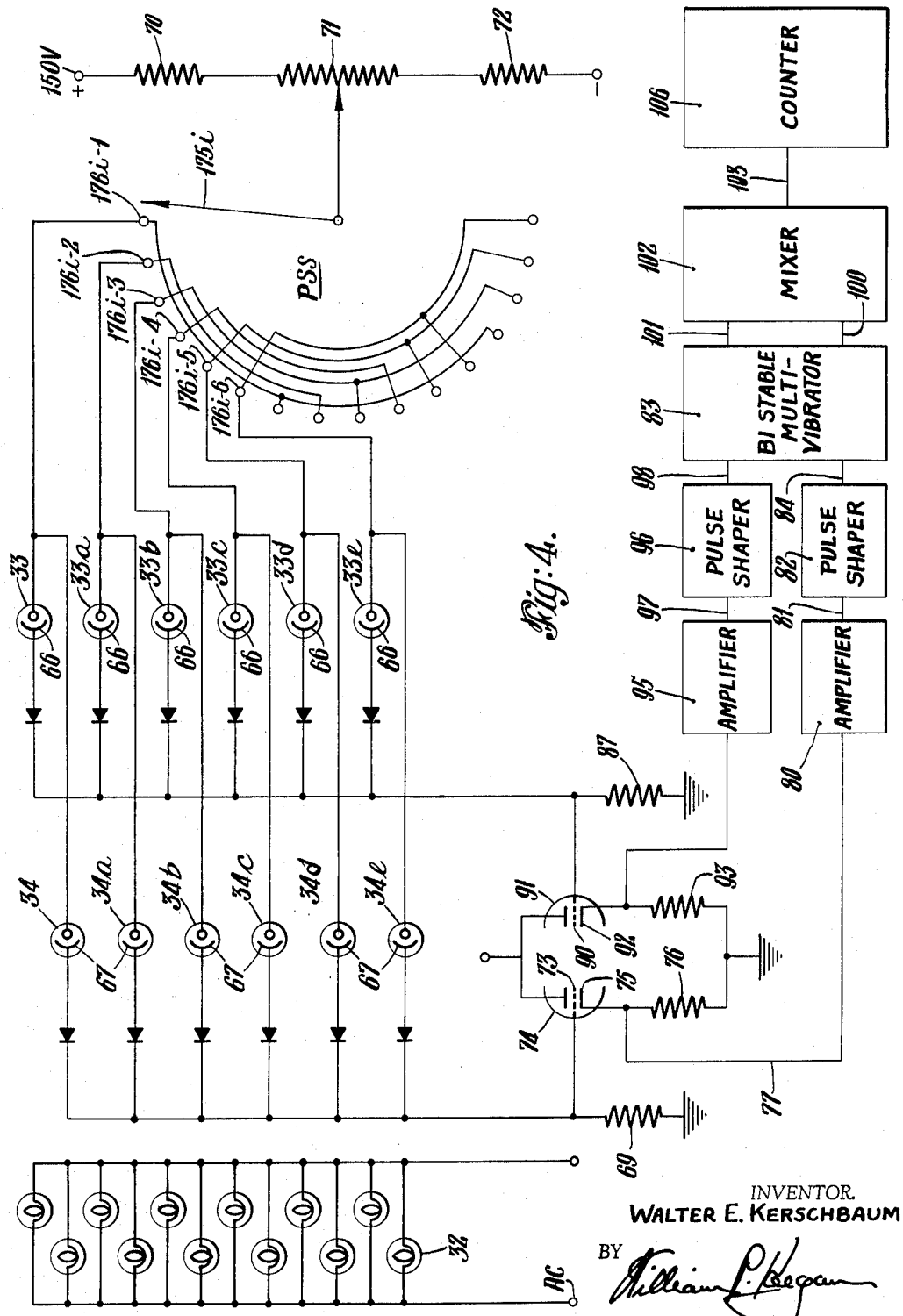

United States Patent Office 3,255,683
Patented June 14, 1966

3,255,683
PHOTOCOMPOSING MACHINES
Walter E. Kerschbaum, Wellsboro, Pa., assignor to Eltra Corporation, a corporation of New York
Filed Feb. 24, 1964, Ser. No. 346,627
4 Claims. (Cl. 95—4.5)

This invention relates to a phototypographical machine and particularly to a tape operated machine of the general organization disclosed in U.S. Letters Patent No. 2,923,215, issued February 2, 1960, wherein characters are photographed one after another on a strip of sensitized film or paper for line composition as a relative movement takes place between the sensitized film or paper and the position to which character images are projected.

In a machine of the type therein disclosed, a font plate having an array of transparent characters which vary in set widths on a unit basis is interposed between a source of light and a shutter mechanism which serves to selectively expose the various characters. In operation, the shutter mechanism is actuated to expose a character selected to be photographed and the light source is then rendered operative to project light through the character to a lenslet individual to the character. The lenslet forms the light which passes therethrough into a bundle of collimated rays and these impinge on an imaging lens common to all the lenslets. The imaging lens, in turn, serves to form, in space and on its optical axis, an image of the selected character. A point size changing lens system is provided comprising two eye piece lenses whose combined function is to vary the size of magnification of the selected character as it is finally recorded on the sensitized film or paper. The eye piece lenses also serve to transmit the light forming the image in space as a bundle of collimated light rays to a mirror carried by a photographic lens carriage that continuously traverses the sensitized film during the composition of a line, the film remaining stationary during composition. The mirror deflects the bundle of light rays at an angle of 90° and directs it to a further lens system which is also mounted on the moving carriage and which serves to decollimate the light rays and project them onto the stationary light sensitive film to form an image of the selected character in a point size controlled by the setting of the eye piece lenses.

The operation of the machine is controlled by means of a coded tape. Each character to be photographed is represented on the tape by a code signal which may be thought of as comprising two portions, one of which identifies the character and controls the operation of the shutter mechanism to selectively expose the character to be photographed, and the other portion of which represents the set width of the character in units of an em and is transmitted to an electronic counter. An opaque grating or grid plate, having a row of translucent slits spaced apart in units of an em of the point size of the photographed characters, is secured to the carriage for movement therewith and traverses a light beam extending from a light source to a photocell in such a manner as to transmit the light beam to the photocell for each unit of an em travelled by the carriage. The resulting pulses from the photocell are transmitted to the electronic counter. When the number of pulses from the photocell correspond with the numerical value of the unit width of the character transmitted to the counter by the code signal on the tape, the counter generates an output pulse which momentarily flashes the source of light behind the font plate to thus photograph the selected character onto the light sensitive film.

Since the movement of the photographic lens carriage is measured in units of an em, it necessarily follows that when it is desired to photograph characters of a different point size, the aforementioned grating must be repositioned to bring a row of translucent slits representative of the new point size into operative position with respect to the light source and photocell. This has been fully explained in Patent No. 2,923,212 which shows a vertically positionable grating that is moved upwardly and downwardly by an electric motor and intermediate drive mechanism in response to a point size signal on the perforated control tape.

Patent No. 2,923,214, issued February 2, 1960, discloses and claims a grating in which, for a single point size, two rows of translucent slits are provided so that pulses are generated alternately from each grating to minimize a false count through spurious pulsing when the photographic lens carriage is halted during line composition, as when it is desired to change a font plate. Inasmuch as such a grating is used on commercially available photocomposing machines, the present invention will be described with respect to a double row grating even though it is equally applicable with a single row grating so long as separate rows of translucent slits are used for different point sizes.

It is the object of the present invention to provide improved means for selecting and rendering operative the row of translucent slits associated with the point size in which composition is to take place.

In carrying out the present invention there is provided a conventional grating that is fixedly connected to the photographic lens carriage for horizontal movement therewith. Aligned with each row of translucent slits of the grating are a light source and a photocell which are spaced apart and stationarily mounted on the machine frame so that the grating can be moved therebetween during line composition. Only the photoresponsive device associated with the row of translucent slits of the point size in which composition is taking place will be operative and this is effected by a switching device that is actuated in response to a point size signal on the coded tape which controls operation of the machine.

Features and advantages of this invention will be gained from the foregoing and from the description of a preferred embodiment thereof which follows.

In the drawings:

FIG. 4 is a schematic wiring diagram of the pulse generating circuitry of the present invention.

Figure 1:
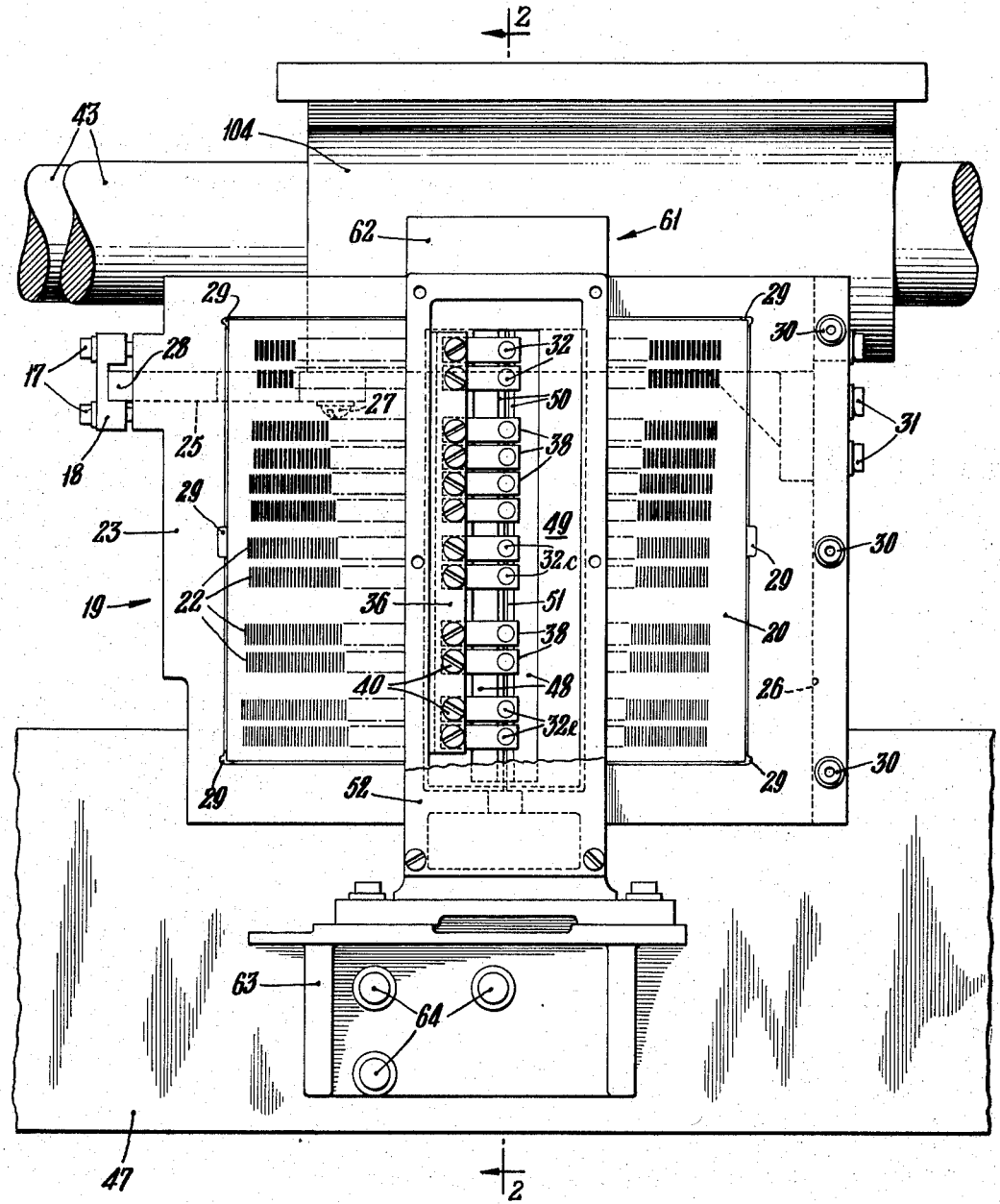
FIG. 1 is a front elevational view showing a grating and pulse generating apparatus according to the present invention.

In a photocomposing machine of the type disclosed in aforementioned Patent No. 2,923,212, the photographic lens carriage traverses the stationary film continuously. Consequently, there is provided means for determining at which point of carriage travel a character is to be photographed. Such means include the point size grating 19 which depends from the carriage so as to be translated therewith. The grating, which cooperates with stationary photoresponsive devices in a manner hereinafter to be described, itself includes a plurality of pairs of translucent slits equally spaced on an opaque background. The leading edge, considering the direction of travel of the grating, of each slit in a selected pair is spaced from the corresponding point of the preceding slit by a distance equal to a unit-of-an-em of the point size for which the pair is provided. Each pair of slits corresponds to a particular point size which can be reproduced in the machine. Thus, by way of example, the six pairs of slits illustrated represent the point sizes 6, 7, 8, 9, 10 and 12, reading from top to bottom, respectively. The means to select the pair of translucent slits with its associated pair of photocells forms the subject matter of this invention and will be described shortly hereafter. The point size grating includes a translucent glass 20 with an emulsion coating adhered thereto. In the final form in which the grating finds utility, the emulsion coating has an opaque background with a series of successively acting translucent slits 22 arranged in pairs and spaced apart such that the leading edge of each slit is one unit-of-an-em of the point size for which the pair is provided from the corresponding position of the next adjacent slit in the pair. The two juxtaposed slits (shown bracketed in FIG. 1 in each pair) are operatively associated one with the other as will be seen more clearly hereinafter. Suffice it to say that in the associated rows of each pair, the disposition of the slits is identical. However, the slits in one of the rows are displaced longitudinally so that the leading edge of each slit, while spaced two units-of-an-em from the corresponding position of an adjacent slit in the same row, is spaced one unit-of-an-em from the corresponding position of nearest slit in the associated row. Therefore, if one considers a pair of light beams traversing the pair of rows of slits, one beam scanning one row and the second beam scanning the other row, one or the other light beam will be pulsed for each unit-of-an-em relative movement between the grating and the light beams. Of course, the light beams will be pulsed alternately.

Figure 2:
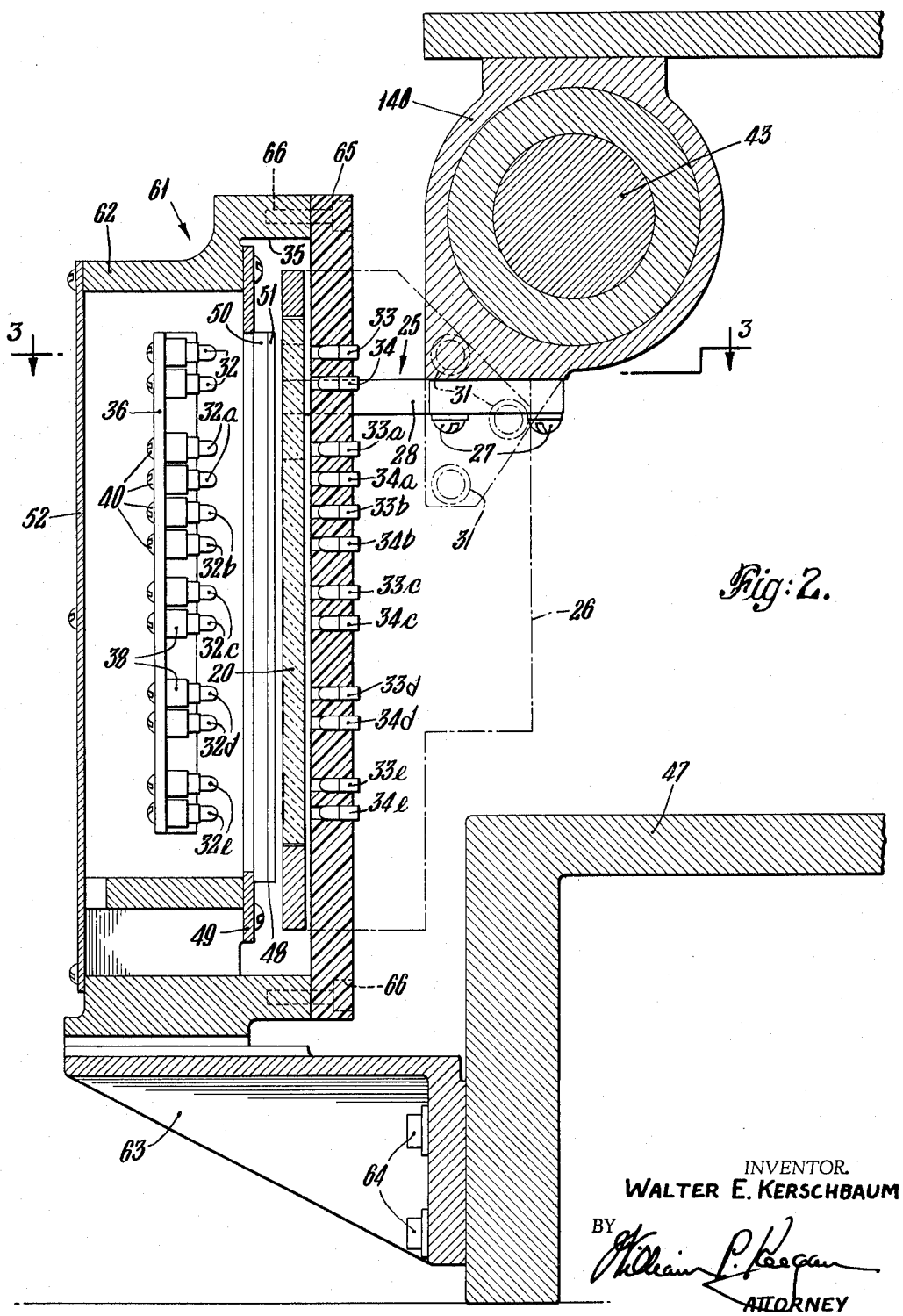
FIG. 2 is an enlarged sectional view taken along line 2—2 of FIG. 1.
Figure 3:
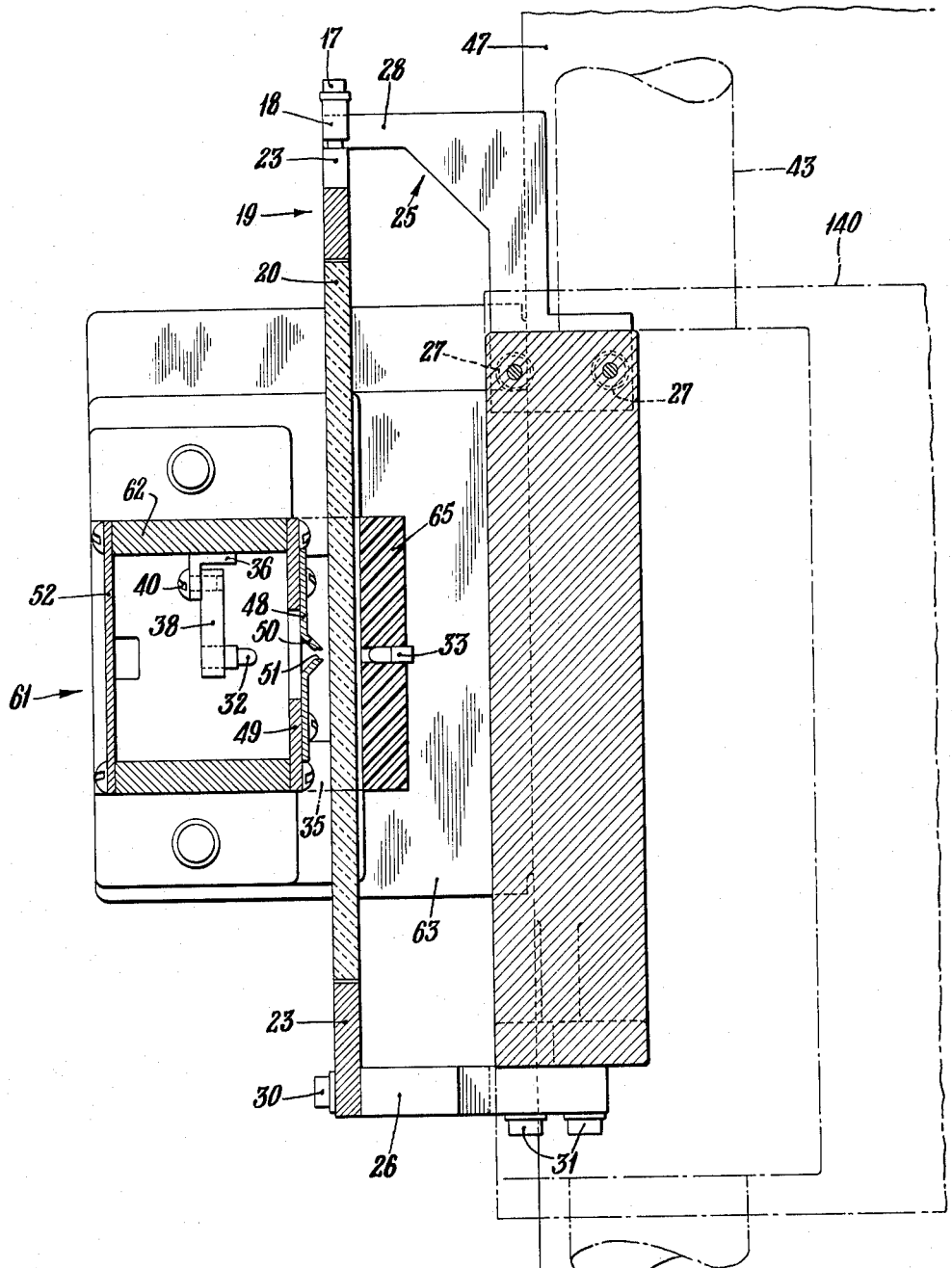
FIG. 3 is a sectional view taken along line 3—3 of FIG. 2.

The point size grating 19 is fixedly mounted on the photographic lens carriage 140 as shown in detail in FIGS. 2 and 3. Carriage 140 is slidably mounted upon two spaced apart rails 43 in such a manner that by its lateral movement it is adapted to project characters onto the sensitized film surface at predetermined intervals. Grating 19 is fixedly mounted on carriage 140 by two brackets 25 and 26. Bracket 25, of angle shaped construction, is fastened by two screws 27 to the underside of carriage 140. A projecting arm 28 is clamped to and supports one end of frame 23 by a clamping member 18 which is secured to the frame by screws 17. The grating 19 is cemented to the frame 23 at the indicated points 29. At the opposite end of frame 23 is located bracket 26, which is fastened to frame 23 by screws 30, and to carriage 140 by screws 31. It will be indicated that the maximum movement of carriage 140 is limited such that neither bracket 25 nor 26 can engage a housing 61 which supports photoresponsive devices or diodes 33 and 34, 33a and 34a, etc., and illumination lamps 32.

Referring again to FIGS. 2 and 3, where it is seen that grating 19 is positioned in a chamber 35 formed in the housing 61. It will be noted that on one side of housing 61 is secured a plurality of photo-diodes. As previously noted, the grating is disclosed having two rows of translucent slits for each point size and as a result the photo-diodes are arranged in pairs: 33, 34; 33a, 34a, etc. On the opposite side of grating 19 is provided a plurality of lamps 32. As shown, the lamps are arranged in pairs which cooperate with their associated pair of photo-diodes. Housing 61 comprises a main casing portion 62 which is fixed to a platform bracket 63, anchored to the bed casting 47 of the machine by bolts 64. Three plates are mounted on housing 61; the first, back plate 65, is secured to the back of housing 61 by machine screws 66 and, as shown, provides the mounting means for each pair of photo-diodes. The second, plate 48, is secured by screws to transverse member 69 of housing 61, and is provided with an extruded aperture portion 50 which forms a narrow slit 51 through which the light from lamps 32 passes towards the photo-diodes. If desired, the width of the slit 51 may be made adjustable so that the width of the passing light beam can be controlled. In general, the width of the slit will be such as to insure that the light beam from lamps 32 to the diodes; e.g., 33a, 34a, will be interrupted by the opaque portions between the slits. As seen in FIG. 2, the aforesaid chamber 35 is actually formed between the two plates 65 and 69. The last and third plate 52 is secured by screws to the front of housing 61 and is adapted to provide a readily removable inspection port for the mechanism enclosed by the housing 61. Each of the lamps 32 is supported on an angle bracket 36 fixed to an inside wall of housing 61. Each lamp is mounted in a strap member 38 which is secured to the bracket 36 by a screw 40. By loosening this screw 40 and rotating strap 38 in a circular arc, a lamp 32 may be perfectly aligned with slit 51 and its associated photo-diode.

Turning now to a consideration of the photo-diodes and their cooperating light sources, it will be understood that although in the preferred embodiment a separate lamp has been provided for each photo-diode, a single source of illumination or lamp might also be successfully employed. This is because the source of light is constantly on, and the interruption or pulsing is provided as the translucent slits 22 of grating 19 move past the light source 32. Since the lamp associated with each photo-diode is constantly on it will be appreciated that selection means 175 must be provided to choose the proper pair of photo-diodes to be operative. Thus, for the purpose of this disclosure, the to be described selection means might be considered to be six separate open switches; each one in series with its own pair of photo-diodes. The closure of any one of the switches will of course render its associated pair of photo-diodes active, and connect them to an electronic counter 105. An inspection of FIG. 4 discloses that a single counter circuit need only be employed for each pair of photo-diodes. This circuit will be detailed later. It might be well to note here that the all of the lamps, except those associated with the operative photo-diodes, could also be disconnected from the circuit. However, the lamp life is sufficiently long that this is not deemed necessary.

As an aside, it will be understood that the term "photo-diode" broadly encompasses any applicable light sensitive means, and that selection means may be embodied by any other arrangement for selecting one of six circuits under the control of a coded tape.

Patent No. 2,923,212 disclosed a mechanism whereby a point size signal coded on a control tape was decoded and actuated a stepping switch, the movable arms of which were positioned in accordance with the signal decoded. The stepping switch was connected in circuits which effected a control dependent on the point size of the characters being composed.

In FIG. 4 the movable arm 174 and brush 175 as well as contacts 176i–1, 176i–2, etc., can be an additional level on point size stepping switch PSS of the above Patent No. 2,923,212. Thus, depending on the point size signal decode any selected pair of photo-diodes 33, 34; or 33a, 34a, etc., will be rendered operative at one time.

In operation, when a point size signal is decoded and stepping switch PSS actuated in response to such signal, brush 175i will contact a selected one of contacts 176i–1, 176i–2, etc., to establish a circuit for rendering operative one pair of photo-diodes, e.g. 33, 34. The photo-diode 34 is thereby connected in a potentiometer circuit comprising resistors 70, 71 and 72 which are connected to a 150 volt power supply and ground as shown. The junction between the photo-diode cathode 67 and grid resistor 69 is connected to the grid 73 of tube 74, the tube normally being in an extinguished or non-conducting condition. However, when photo-diode 34 begins to conduct current, as when the cathode thereof is illuminated by its light source 32 as a slit on the grating, as distinguished from the opaque background of the grating, is interposed between the light source 32 and the photo-diode 34, a voltage is imposed on grid 73 causing tube 74 to fire and conduct current. Thereafter when the slit is completely traversed, the photo-diode ceases to conduct and tube 74 is extinguished. When tube 74 first conducts and then is extinguished, the voltage at cathode 75 rises from its quiescent value to a higher voltage and thereafter falls to its quiescent value and, therefore, a positive voltage pulse is generated across cathode resistor 76, which pulse is transmitted over conductor 77. The pulse is then amplified in amplifier 80 and a positive pulse output is transmitted over conductor 81 to the next circuit stage, namely, to pulse shaper 82, which merely provides a pulse of the proper waveform for operation of the pulse circuitry. The pulse which is still a positive voltage pulse, is next transmitted to the bi-stable multivibrator 83 over the conductor 84 leading to the first stage of the multivibrator.

The pulse generating circuit has been considered up to this point as operable solely by photocell tube 34, which of course is a possible arrangement. We will next consider the second photo-diode 33 and trace the pulses generated thereby.

The second photo-diode 33 is connected to a potentiometer circuit comprising resistors 70, 71 and 72, similar to the one previously discussed. When the photo-diode is energized as by a slit in the grating traversing the light beam from source 31, a voltage is applied to grid 90 of tube 91, thereby causing the tube to conduct. As further carriage travel carries the grating so that the slit is moved out of the light beam and the opaque background of the grating interrupts the beam to deenergize the photo-diode, the voltage which was applied to grid 90 is removed and tube 91 is extinguished. Consequently, the voltage at cathode 92 was first raised and restored to its normal value, thereby resulting in a positive pulse being generated across cathode resistor 93 and transmitted over conductor 94. The pulse is amplified in amplifier 95 and then transmitted to the pulse shaper 96 over conductor 97, after which it is transmitted to the second stage of the bi-stable multivibrator 83 over conductor 98.

Because of the staggered arrangement of slits in the pair of associated rows (FIG. 2), the pulses generated by the two photo-diodes follow one another alternately from each photo-diode. The pulses generated by one photo-diode tube e.g. 34, trigger the bi-stable multivibrator so that, for example, the first tube therein produces an output pulse, whereas the pulses generated by the other photo-diode i.e. 33, trigger the multivibrator so that the second tube therein produces an output pulse.

The output pulses from multivibrator 83 are transmitted over conductors 100 and 101 to the mixer circuit 102 which combines the two independent pulse trains into a single pulse train, the pulses of which are transmitted as positive pulses to conductor 103. From conductor 103, the pulses may travel over conductor 104 to the counter 106 where they are utilized in the known manner.

Inasmuch as many apparently widely different embodiments of the invention can be made without departing from its spirit or scope, it is to be understood that the specification and drawings are to be interpreted as illustrative rather than in a limiting sense.

What is claimed is:

1. Means for measuring the extent of line composing movement in a phototypographical machine comprising a grating that partakes of such movement having a plurality of pairs of rows of light transmitting slits, the slits in each row of a pair being spaced apart two units of a typographical em of the point size for which the row is provided, and the slits in one row of a pair being horizontally spaced one unit of the typographical em from the slits in the other row of the pair, a plurality of photo-responsive means each of which is aligned with a row of light transmitting slits, light means, said photo-responsive means and said light means being fixedly mounted on the machine such that said grating passes therebetween when partaking of line composing movement, and means for operatively selecting the photo-responsive means associated with a pair of rows of light transmitting slits for the point size in which composition is to take place whereby during line composition only the selected photoresponsive means will alternately generate pulses representing line composition movement.

2. Means for measuring the extent of line composing movement according to claim 1 wherein the light means includes a light source for each row of light transmitting slits and the photoresponsive means is a photo-diode.

3. Means for measuring the extent of line composing movement according to claim 2 wherein the phototypographical machine is tape controlled and the selecting means is a stepping switch which is actuated in response to a point size signal coded on the control tape.

4. Means for measuring the extent of line composing movement in a tape controlled phototypographical machine comprising a grating that partakes of such movement having a plurality of rows of light transmitting slits, the slits sin each row being spaced apart a distance measured in units of a typographical em of the point size for which the row is provided, a plurality of photoresponsive means each of which is aligned with a row of light transmitting slits, light means, said photoresponsive means and said light means being fixedly mounted on the machine such that said grating passes therebetween when partaking of line composing movement, stepping switch means connected to said plurality of photoresponsive means, and means responsive to a point size signal on a control tape for actuating said stepping switch means to operatively select the photoresponsive means associated with the row of light transmitting slits for the point size in which composition is to take place whereby during line composition only the selected photoresponsive means will generate pulses representing line composition movement.

References Cited by the Examiner

UNITED STATES PATENTS

| | | | |
|---|---|---|---|
| 2,923,214 | 2/1960 | Gorrill | 95—4.5 |
| 2,966,835 | 1/1961 | Hooven | 95—4.5 |
| 3,106,880 | 10/1963 | Rossetto | 95—4.5 |

JOHN M. HORAN, *Primary Examiner.*